United States Patent [19]

Takahashi

[11] 3,803,367

[45] Apr. 9, 1974

[54] RECORDING SYSTEM FOR A MULTICHANNEL RECORD DISK

[75] Inventor: Nobuaki Takahashi, Yamato, Japan

[73] Assignee: Victor Company of Japan, Ltd., Yokohama, Japan

[22] Filed: June 8, 1972

[21] Appl. No.: 260,964

[30] Foreign Application Priority Data

June 12, 1971 Japan ................................ 46-41864

[52] U.S. Cl. ......... 179/100.4, 179/15 BT, 179/100.1

[51] Int. Cl. ........................... G11b 3/00, G11b 3/74

[58] Field of Search ............ 179/100.4 ST, 100.4 C, 179/100.4 M, 100.4 D, 15 BT, 15 BM, 100.1 TD

[56] References Cited

UNITED STATES PATENTS

| | | | |
|---|---|---|---|
| 3,538,259 | 11/1970 | Brahman | 179/15 BT |
| 3,401,237 | 9/1968 | Takayanagi | 179/100.4 C |
| 3,603,882 | 9/1971 | Wilson | 179/15 BM |
| 3,686,471 | 8/1972 | Takahashi | 179/100.4 ST |
| 3,548,112 | 12/1970 | Pearson | 179/100.1 TD |
| 3,662,354 | 9/1972 | Chertok | 179/100.4 C |
| 3,229,048 | 1/1966 | Fox | 179/100.4 ST |
| 3,111,635 | 11/1963 | Skov et al. | 179/100.4 C X |
| 3,083,264 | 3/1963 | Wintringham | 179/100.4 ST |

*Primary Examiner*—Paul J. Henon
*Assistant Examiner*—Mark Edward Nusbaum

[57] ABSTRACT

A system for recording a plurality of signals in a single sound groove in a record disk by multiplexing a direct-wave sum signal and an angular-modulated difference signal for every two signal channels. The recording is made by a combination of means for angular-modulating the difference signal and for controlling the phase of a carrier to be angular modulated by a part of the sum signal. The phase control means accomplishes phase control in a manner which causes the angular-modulated difference signal to undergo phase deviations by an angle which cancels out the phase deviation which would be caused in the angular-modulated difference signal by the direct wave sum signal during the reproduction of sound from a multichannel record disk by the use of a reproducing stylus.

13 Claims, 16 Drawing Figures

RECORDING SYSTEM FOR A MULTICHANNEL RECORD DISK

BACKGROUND OF THE INVENTION

This invention relates to a recording system for a multichannel record disk and more particularly to a system in which phase fluctuations are reduced, at the time of reproducing sound from a multichannel record disk. Reproduction can be accomplished without the occurrence of phase fluctuations with respect to an angular modulated wave signal due to a direct wave signal. Conversely, multichannel recording is accomplished by intentionally imparting a predetermined compensating phase fluctuation component.

The applicant had previously proposed a recording and/or reproducing system for four channel record disk as disclosed in the specification of U.S. Patent application Ser. No. 92,803, filed Nov. 25, 1970, now U.S. Pat. No. 3,686,471, issued Aug. 22, 1972. By this proposed system, in the recording system, sum and difference signals are formed respectively from signals of every two channels of the signals of four channels. More specifically, the four signals are respectively designated by the notations Ch1, Ch2, Ch3, and Ch4, from first through fourth channels. Sum signals ( Ch1 + Ch2 ) and ( Ch3 + Ch4 ) and difference signals ( Ch1 − Ch2 ) and ( Ch3 − Ch4 ) are formed from these four signals. Thereafter, the different signals are frequency-modulated, and frequency modulated wave difference signals F ( Ch1 − Ch2 ) and F ( Ch3 − Ch4 ) of a band higher than the above mentioned direct-wave sum signals are obtained. These signals are mixed with the direct-wave sum signals ( Ch1 + Ch2 ) and ( Ch3 + Ch4 ).

The two multiplexed signals [(Ch1 + Ch2) + F(Ch1 − Ch2)] and [(Ch3 + Ch4) + F(Ch3 − Ch4)] of the direct-wave sum signals and the frequency-modulated wave difference signals are recorded by respectively cutting them on the left and right walls of a groove of the 45 — 45 system on a record disk.

In the reproducing system, reproduced multiplexing signals are respectively separated into direct-wave sum signals and frequency-modulated wave difference signals. The latter signals are demodulated, and the original difference signals are again obtained. The sum signal ( Ch1 + Ch2 ), difference signal ( Ch1 − Ch2 ), sum signal ( Ch3 + Ch4 ), and difference signal ( Ch3 − Ch4 ) obtained in this manner are respectively matrixed. The original signals Ch1, Ch2, Ch3, and Ch4 of the four individual channels are again obtained. These signals are reproduced audibly from four loudspeakers disposed respectively at the left front, left rear, right front, and right rear positions relative to a listener.

The frequency-modulated difference signals which have been cut and recorded on a record disk have high frequencies. The frequencies of the direct-wave sum signals are low. In general, the point of a reproducing stylus for picking up signals from a record disk has a finite radius. For this reason, as will be described in detail hereinafter, the direct-wave sum signals produce phase fluctuations in the frequency-modulated signal, when signals are reproduced from the multichannel disk by the use of a reproducing stylus.

This is the reason why some problems are yet to be solved, such as noise and signal distortion due to overmodulation. An important feature of this invention is that before recording signals, a phase fluctuation component is added to the signal for compensating for the phase fluctuation component occurring in the reproduction of signals by the reproducing stylus. Accordingly, the recorded angular-modulated signals have been phase-controlled by the direct wave signal. The phase fluctuation component that has been imparted beforehand and the phase fluctuations caused by the reproducing stylus cancel each other during reproduction. Thus no phase fluctuation component exists in the reproduced signals.

SUMMARY OF THE INVENTION

Accordingly, it is a general object of this invention to provide a new and useful multichannel recording system for record disks, in which some of the above described problems have been solved.

More specifically, an object of this invention is to provide a system in which the angular-modulated signal is phase-controlled by the direct wave signal during the recording of the direct wave signal and the angular-modulated signal, so as to be superimposed upon each other.

Another object of this invention is to provide a system in which the angular-modulated signal and the direct-wave signal are superimposed upon each other and recorded after the angular-modulated wave has been phase-deviated by an angle which cancels the phase fluctuation component that would be caused in the angular-modulated wave by the direct-wave signal.

A further object of this invention is to provide a recording system in which phase modulation is so controlled that the level of a control signal is adjusted in response to the tangent of an inclination angle and thereafter, the tangent is converted into a sinusoidal (sine) function.

These and other objects and further features of this invention will become apparent from the following detailed description of this invention when read in conjunction with the accompanying drawings.

DETAILED DESCRIPTION

Figure 1:
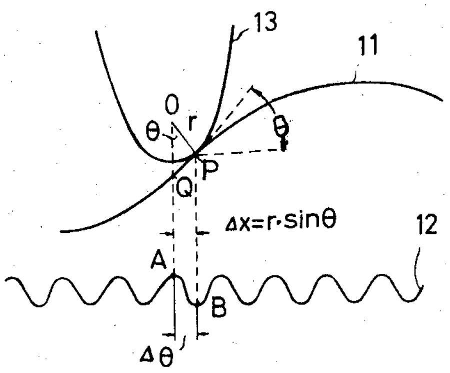
FIG. 1 is a graphical representation indicating the manner in which phase fluctuations are produced by a direct-wave sum signal when an angular-modulated signal is being reproduced.

First, some problems that may arise in reproducing signals from a multichannel record disk will be described in connection with FIG. 1. According to the four-channel disk recording and reproducing system which was previously proposed by this applicant, the superimposed direct-wave sum signal in a frequency band of 30 Hz – 15 KHz and the angle-modulated difference signal in a frequency band of 20 KHz – 50 KHz are cut and recorded on the two side walls of the sound groove of a record disk. The waveform of the superimposed direct-wave sum signal and angle-modulated difference signal which is recorded on each side wall of a groove will be separated, for the purposes of description, as shown by numerals 11 and 12 in FIG. 1. When a reproducing stylus 13, having a point of a radius $r$ ($\mu$m), traces this sound groove to reproduce recorded signals, there arise some problems as will be explained hereinafter.

If it is assumed that the center of the stylus tip is at point O, a position A on the angle-modulated wave 12 should be reproduced at the ideal point Q, just below the center 0. Actually, however, the tip of the stylus 13, with the radius $r$, makes contact with the groove at the point P. Consequently, the tip reproduces position B on the angle-modulated signal wave 12. The angle POQ (which is equal to the inclination angle of the tangent at P) and the displacement length between A and B will be denoted respectively by $\theta$ and $\Delta x$. Then there exists a relationship between $\theta$ and $\Delta x$ expressed as $\Delta x = r\sin\theta$ In other words, if the inclination angle is present in the direct-wave signal, and the tip of the reproducing stylus has the radius $r$, the angle-modulated wave will be phase-deviated by an amount corresponding to $r\sin\theta$ (which is equal to $\Delta x$), and a phase-deviation angle $\Delta\theta$ will be produced. Consequently, the angle-modulated wave signal is phase modulated, by the above mentioned phase deviation angle $\Delta\theta$ by the direct-wave signal at the time of reproduction.

Figure 3:
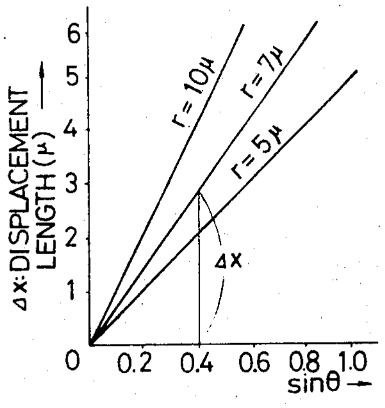
FIG. 3 is a graphical representation indicating the relationship between sin$\theta$ and displacement length.

The three lines shown in FIG. 3 can represent the relationship between sin$\theta$ and the displacement length $\Delta x$, for several values of the radius $r$ taken as the parameter, $r$ being 5, 7, and 10 microns. The relationship between the displacement length $\Delta x$ and the phase deviation angle $\Delta\theta$ for the record disk diameter taken as the parameter of 300 mm and 150 mm (in either case, the rotating speed is 33 ⅓ rpm) can be represented by the two lines in FIG. 4.

When the above-mentioned phase deviation angle $\Delta\theta$ occurs in reproduction, the angle-modulated difference signal undergoes further modulation by the direct wave sum signal to become overmodulated. For this reason, the occurrence of noise, signal distortion, etc. caused by the phase deviation will inevitably be present in the demodulated signal, when the angle-modulated wave signal is demodulated.

A principal feature of this invention resides in imparting a phase deviation of opposite polarity to the recording signal beforehand, during recording, so that the aforementioned phase deviation will be cancelled out in reproduction.

One embodiment of this system will now be described with reference to FIG. 2, in which numerals having suffix *a* represent components in a system of the third and fourth channel signals Ch3 and Ch4. These components are exactly the same in function and composition as the components indicated by the corresponding numerals having no suffix in a system of the first and second channel signals Ch1 and Ch2. Therefore, the description will be confined to the first and second channel signal system, for the sake of convenience.

Now the first and second channel signals, Ch1 and Ch2, are fed to a matrix circuit 23 from input terminals 21 and 22, respectively so that these signals are matrixed. The sum signal (Ch1 + Ch2), from the matrix circuit 23, is delayed by a delay circuit 24 before it is fed to a mixer 25. A function of the delay circuit 24 is to provide a suitable delay time for the sum signal. The the delay time is matched to a delay time of the difference signal caused in modulation or demodulation as will be described hereinafter. Another function of the delay circuit 24 is to fulfil the role of a low-pass filter for cutting off signal frequencies in excess of 15 KHz. As a result, the sum signal is delayed by the delay circuit 24 and at the same time, its bandwidth is restricted to a range from 30 Hz to 15 KHz.

Figure 5:
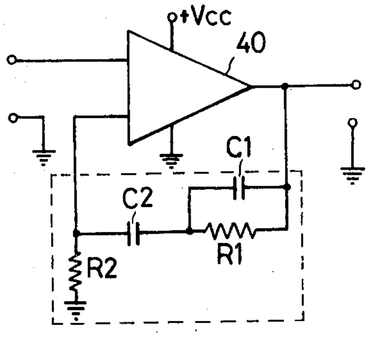
FIG. 5 is a circuit diagram of an example of an equalizer.
Figures 6, 7:
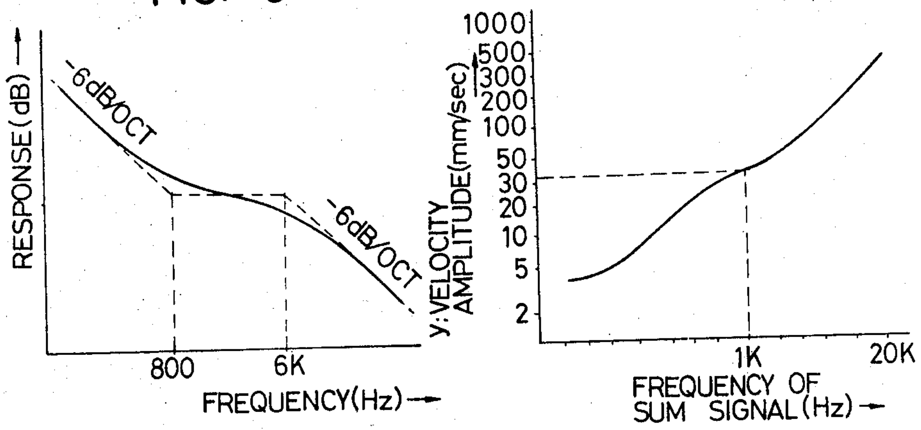
FIG. 6 is a graphical representation indicating the equalizing characteristic of the equalizer shown in FIG. 5.
FIG. 7 is a graphical representation indicating the relationship between a sum signal frequency and velocity amplitude.

The output difference signal (Ch1 − Ch2) from the matrix circuit 23 is fed to an equalizer 26 for equalization, which has a circuit structure, for example, as shown in FIG. 5. Its characteristic is determined by a network consisting of resistors R1 and R2 and capacitors C1 and C2 and connected as a negative feedback circuit to an amplifier 40 as illustrated. According to this embodiment, the equalizer 26 has a frequency response as indicated in FIG. 6. As illustrated, the response curve has an inclination of −6 dB/oct in the frequency regions lower than 800 Hz and higher than 6 KHz with a flat portion in a frequency range of 800 Hz – 6 KHz as shown by the dotted curve. The actual frequency response of this range is represented by a full line curve of which the dotted curve is an asymptote.

The difference signal, whose frequency response is converted as shown in FIG. 6 by the equalizer, is fed to a phase modulator 27 to undergo angle modulation. By angle modulating a carrier with the difference signal, an angle-modulated difference signal A(Ch1 − Ch2) is obtained in a frequency band of 20 KHz – 50 KHz. The modulated signal is frequency-modulated (FM) for frequencies below 800 Hz, phase-modulated (PM) for frequencies between 800 Hz and 6 KHz, and frequency-modulated (FM) for frequencies above 6 KHz. It is to be noted here that, at the reference level, the FM deviation width in the frequency range below 800 Hz is ±800 Hz, the PM phase deviation angle in the frequency range of 800 Hz – 6 KHz is ±1 radian, and the FM deviation width in the frequency range above 6 KHz is ±6 KHz.

Figure 2:
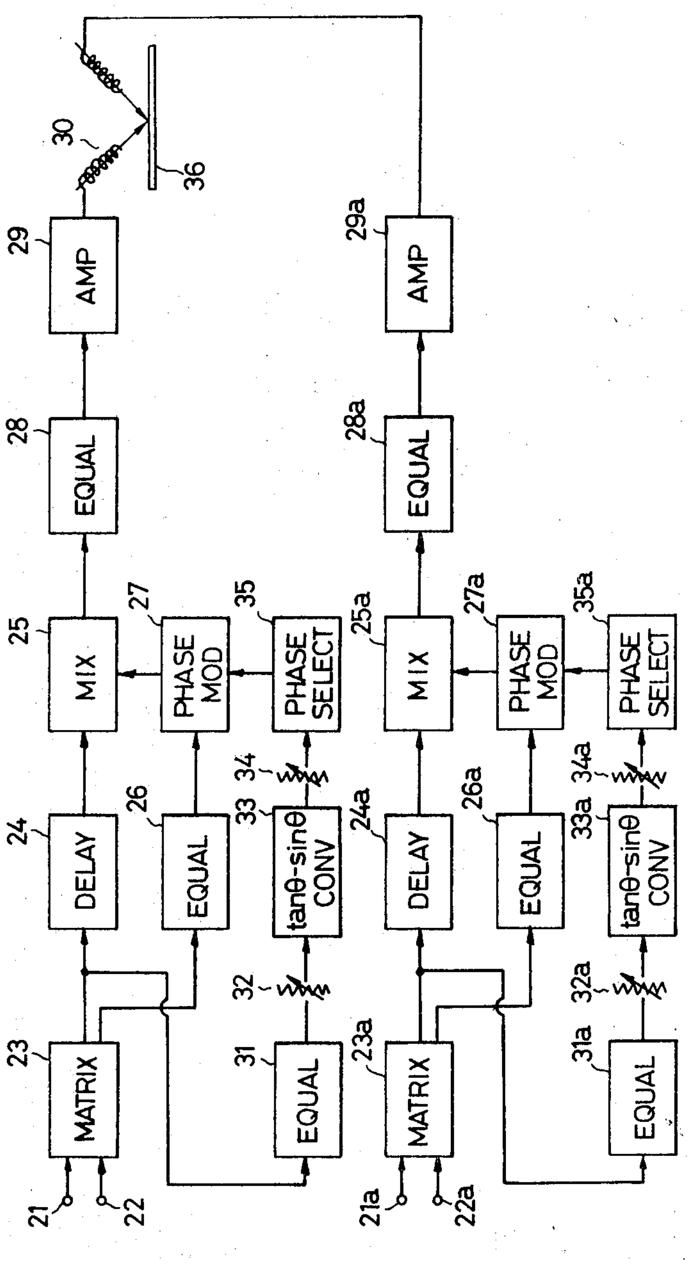
FIG. 2 is a block diagram indicating one embodiment of the multichannel disk recording system according to this invention.

A phase modulator 27 in the block diagram of FIG. 2 shares a single carrier oscillator (not shown in FIG. 2) with a phase modulator 27a in the third and fourth channel signal system.

The angle-modulated difference signal output A(Ch1 − Ch2) from the phase modulator 27 is fed to a mixer 25. The angle-modulated difference signal is mixed with the direct wave, sum signal (CH1 + Ch2) delivered from the delay circuit 24 by the mixer to become a multiplex signal. The multiplex signal output [(Ch1 + Ch2) + A(Ch1 − Ch2)] is fed from the mixer 25 is fed to an equilizer 28 with a characteristic conforming to the RIAA standard characteristic. Then, the multiplex signal undergoes amplification by a cutter driving amplifier 29 with a wide frequency range. The amplified multiplex signal is fed to a left-channel driving coil of a cutter 30. A multiplex signal [(Ch3 + Ch4) + A(Ch3 − Ch4)] is obtained from signals Ch3 and Ch4 of the third and fourth channels. This multiplex signal is derived from an amplifier 29a through a system of the same circuit structure as mentioned previously. It is also fed to a right-channel driving coil of the cutter 30. Accordingly, the recording cutter 30 cuts the multiplex signal derived from the first and second channel signals and that derived from the third and fourth channel signals on the left and right walls of a 45 — 45 system groove on a lacquer-coated disk 36.

An essential part of the multichannel recording system of this invention will now be described. A poriton of the output sum signal (Ch1 + Ch2) from the matrix circuit 23 is fed to an equalizer 31 with the RIAA characteristic. The equalizer 31 is provided with a speed amplitude vs. frequency response (conforming to the RIAA standard characteristic) as shown in FIG. 7 for a record disk having a reference speed amplitude of 35.4 mm/sec at 1 KHz.

Figure 8:
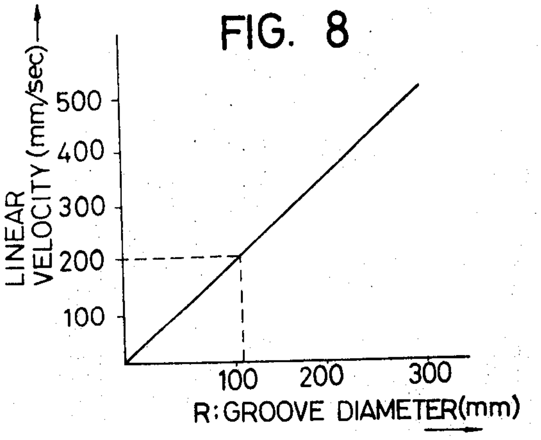
FIG. 8 is a graphical representation indicating the relationship between sound groove diameter and linear velocity.

The output signal from the equalizer 31 passes through a sound groove diameter selecting circuit 32, or a variable resistor constituting a kind of attenuator. The relationship between the distance of a reproducing sound groove from the record disk center (which is the radius of the sound groove) and the linear velocity of the sound groove is as indicated in FIG. 8, assuming the rotating speed of the disk is 33 ⅓ r.p.m. In this case, the linear velocity $x$ is given by $$x = N/60 \times 2\pi R$$

where $N$ = number of revolutions (r.p.m.), and $R$ = sound groove radius.

Figure 9:
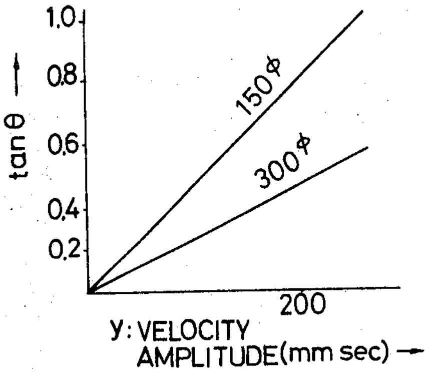
FIG. 9 is a graphical representation indicating the relationship between velocity amplitude and tan$\theta$.

With the actual record disk, signals are recorded until the innermost position on the record disk is at the diameter of 120 mm and the linear velocity is 200 mm/sec. FIG. 9 shows the relationship between the speed amplitude and tan $\theta$ for the disk record of different sound groove diameter. The level of the sum signal is controlled by the sound groove diameter selecting circuit 32 for the sound groove diameter and the velocity amplitude in response to the value of tan $\theta$ as indicated in FIG. 9.

The linear velocity and the velocity amplitude will be denoted respectively by $x$ (refer to FIG. 8) and $y$. The velocity is that taken in a direction normal to the direction in which the disk or stylus progresses. Then, tan $\theta$ can be expressed as $$\tan\theta = y/x$$

or $$\tan\theta = y/x = y/(33\ 1/3)/60 \times 2\pi R$$

for disk speeds of 33 ⅓ r.p.m.

The sum signal has a level controlled by the circuit 32 in response to tan $\theta$ (which is determined by the linear velocity $x$ and the velocity amplitude as described previously). This controlled signal is subsequently fed to a tan $\theta$ − sin $\theta$ conversion circuit 33. A function to be compensated for ultimately is that of sin $\theta$. Therefore, a function of tan $\theta$ thus compensated for is converted into a function of sin $\theta$ by the conversion circuit 33.

Figure 10:
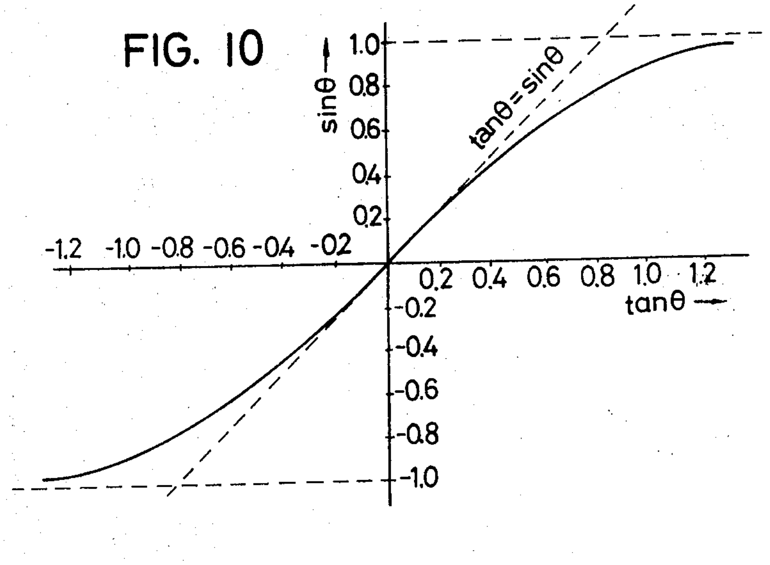
FIG. 10 is a graphical representation indicating the relationship between tan$\theta$ and sin$\theta$.

The relationship between tan $\theta$ and sin $\theta$ is generally expressed as $$\tan\theta = \sin\theta/\cos\theta = \sin\theta/\sqrt{1-\sin^2\theta},$$

and this relationship can be represented by a curve as shown in FIG. 10.

The tan $\theta$ − sin $\theta$ conversion circuit 33 is designed to develop an output voltage of $2(1/\sqrt{2}) = 1.414$ volts, assuming that a voltage of corresponding to tan $\theta$ of 2 volts is obtained for tan 45°, for example. A characteristic curve indicating the input voltage vs. output voltage relationship of the circuit 33 is shown in FIG. 11.

Figure 4:
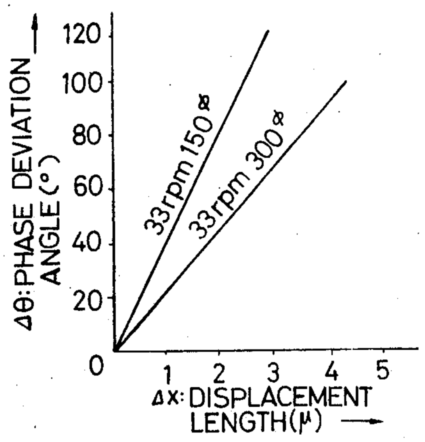
FIG. 4 is a graphical representation indicating the relationship between displacement length and phase deviation angle.
Figure 11:
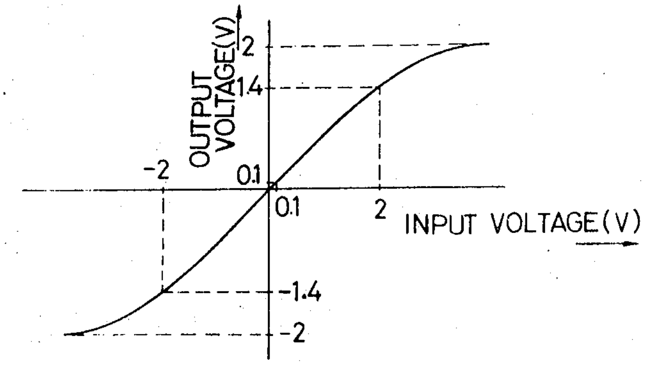
FIG. 11 is a graphical representation indicating the input and output characteristic of a tan$\theta$ − sin$\theta$ conversion circuit.
Figure 12:
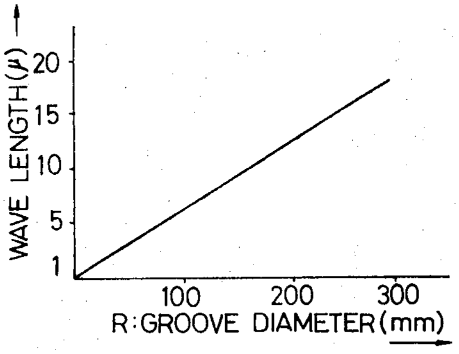
FIG. 12 is a graphical representation indicating the relationship between the sound groove diameter and wavelength.

The sum signal has a level converted from tan $\theta$ into a function of sin $\theta$ by the tan $\theta$ − sin $\theta$ conversion circuit 33 which is provided with the input - output characteristic as shown in FIG. 11. This converted signal is fed to a reproducing stylus radius selecting circuit 34. The sum signal is level-controlled in this circuit by the value of sin $\theta$ as shown in FIG. 3, in response to the stylus tip radius $r$ of the reproducing stylus 13. For example, assuming that the frequency $fc$ of an unmodulated carrier is 30 KHz, the carrier wavelength λ varies as shown in FIG. 12 with the sound groove diameter for the record disk rotating speed of 33 ⅓ r.p.m.. The phase deviation angle $\Delta\theta$ varies with the displacement length in a manner as shown in FIG. 4. In this connection, the wavelength λ is given by $\lambda = x/30{,}000$ mm $= x/30$ microns, where $x$ is linear velocity and carrier frequency is 30 KHz.

The output of the reproducing stylus radius selecting circuit 34 is fed to a phase selecting circuit 35, which is designed to change the signal phase by either 0° or 180°. An established standardization specifies that in cutting and recording, the groove walls shall move upward (downward) when the left (right) channel signal is of positive polarity. The circuit 35 has a signal polarity conforming to this standardization.

Figure 13A:
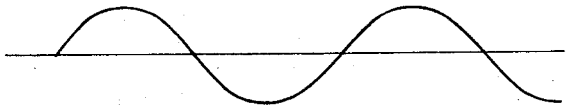
FIGS. 13A and 13B show waveforms for an explanation of phase modulation by a sum signal.
Figure 13B:
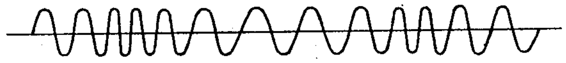

The output sum signal from the phase selecting circuit 35 is fed to the previously mentioned phase modulator 27, whereby the signal is modulated with the phase deviation angle $\Delta\theta$ when the difference signal is phase-modulated. The phase deviation angle component to be added must be a value sufficient for cancelling out the phase deviation angle $\Delta\theta$ that occurs in sound reproduction. For instance, in cases where a carrier with a constant frequency is derived from the phase modulator 27 in the absence of a signal to be delivered from the circuit 35, the carrier is phase-modulated in a manner as indicated in FIG. 13B with the sum signal delivered from the circuit 35 shown in FIG. 13A. As will be apparent from both figures, the modulated wave frequencies corresponding to the crest and valley portions of the sum signal are respectively high and low.

Figure 14:
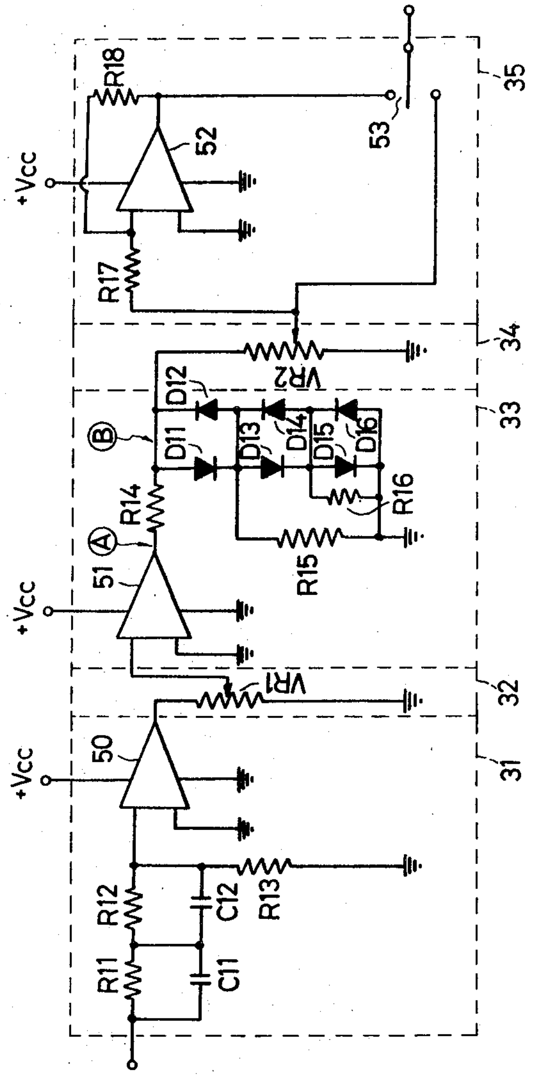
FIG. 14 is a circuit diagram of an essential part of the system illustrated by the block diagram in FIG. 2.

One embodiment of an electrical circuit composed of the equalizer 31, sound groove diameter selecting circuit 32, tan $\theta - \sin\theta$ conversion circuit 33, reproducing stylus radius selecting circuit 34, and the phase selecting circuit 35 is shown in FIG. 14.

The equalizer 31 comprises a network including resistors R11, R12, and R13, capacitors C11 and C12, and an amplifier 50 and having a known circuit structure and a characteristic defined by the RIAA standard characteristic. The sound groove diameter selecting circuit 32 is composed of a variable resistor VR1, which is adjusted so that the voltage at point B of the subsequent tan $\theta - \sin\theta$ conversion circuit 33 becomes 1 volt, this setting being taken as a reference state.

Figure 15:
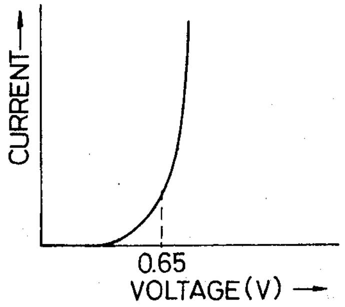
FIG. 15 is a graphical representation indicating the current vs. voltage characteristic of a silicon diode.

The tan $\theta - \sin\theta$ conversion circuit 33 comprises a network including an amplifier 51, resistors R14 through R16, and diodes D11 through D16. According to this embodiment, the resistance values of the resistors are chosen as follows: R14 = 10 KΩ, R15 = 22 KΩ, R16 = 4.7 KΩ, and all diodes D11 through D16 are silicon diodes, each having a voltage - current characteristic as shown in FIG. 15, presenting high resistance values for low voltages and low resistance values, (hence, large current conduction) for high voltages.

In the circuit 33, the values of the voltages applied to the diodes D11 and D16 are low, provided the absolute value of the voltage at point A is low. Then the resistance values of these diode circuits are high, and there is no noticeable signal attenuation at point B. As the voltage at point A increases (for instance, 0.65 volt), the diode D12 conducts current through the resistor R15, and the resistance value of the diode network decreases somewhat. However, since the resistance value of the resistor R15 is not lower than that of the resistor R14, the amount of signal attenuation is not excessive. As the voltage at point A further increases (for example, 1.3 volts), the resistance values of not only the diodes D11 and D12 but also the diodes D13 and D14 are diminished, and current is conducted through the resistor R16, with the result that the attenuation degree at point B further increases. As the voltage at point A becomes ±2 volts, for example, the diodes D11 through D16 become conductive, and the attenuation at point B further increases, while the output voltage does not increase beyond a predetermined constant value. In this manner, an output voltage having a relationship as shown in FIG. 11 can be obtained for the input voltage with the tan $\theta - \sin\theta$ conversion circuit 33. Therefore, a voltage proportional to tan $\theta$ is converted into a voltage proportional to sin $\theta$.

The reproducing stylus radius selecting circuit 34 consists of a variable resistor VR2. For instance, the displacement $\Delta x$ (for $\sin\theta = 0.5$ and stylus point radius $r = 7$ microns) is obtained and then, $\Delta\theta$ for the sound groove diameter is obtained from FIGS. 4 and 12. Since one wavelength corresponds to 360°, $\Delta\theta$ is given by $$\Delta\theta = \Delta x/\lambda \times 360°$$

Then, the variable resistor VR2 is controlled, and the phase deviation angle of the phase modulator 27 is caused to coincide with $\Delta\theta$, this position being taken as a reference position. In such a manner, the sound groove radius R and the stylus point radius $r$ can be determined. Then the positions of the slidable contacts on the variable resistors VR1 and VR2 can be determined.

The phase selecting circuit 35 comprises an amplifier 52, resistors R17 and R18, and a switch 53. Two contacts of the switch 53 are connected respectively to the slidable contact of the variable resistor VR2 and the output side of the amplifier 52. By switching the movable contact of the switch 53 between the two stationary contacts, an output having the 0° or 180° relationship with the input can be derived from the output side of the switch 53.

Further, this invention is not limited to these embodiments but various variations and modifications may be made without departing from the scope and spirit of the invention.

What I claim is:

1. A recording system for a multichannel record disk comprising:

means for supplying four separate channel signals, matrix means operated responsive to said four signals for forming a first sum signal and a first difference signal responsive to first and second channel signals and for forming a second sum signal and a second difference signal responsive to third and fourth channel signals;

means for angle-modulating said first and second difference signals;

mixing means for multiplexing a first multiplex signal responsive to said first sum signal and a first of said angle-modulated difference signals and a second multiplex signal responsive to said second sum signal and a second of said angle-modulated difference signals;

means responsive to said mixing means for cutting and recording said first and said second multiplex signals on the left and right walls, respectively, of a groove on the record disk; and control means responsive to said first and second sum signals for deriving a control signal for said first and second angle-modulated difference signals, said control signal having a characteristic which compensates for phase deviations by an angle sufficient for cancelling a predetermined phase deviation that occurs in said first and second angle-modulated difference signals during reproduction of sound from said cut and recorded record disk by a reproducing stylus, and means for applying said control signal to said angle-modulating means.

2. A recording system for a multichannel record disk according to claim 1 wherein said control means comprises variable resistor means for controlling the level of said sum signal in response to tan $\theta$ determined by the linear velocity ($x$), the velocity amplitude ($y$) and depending on the sound groove diameter (said tan $\theta$ being equal to $y/x$, wherein the angle $\theta$ is formed by an ideal contact point which a reproducing stylus point of radius $r$ makes with respect to the sum signal recorded in the sound groove and an actual contact made with respect to the center of radius r, and means responsive to said level of said control means for converting a level function of tan $\theta$ of an output signal into the level of a function of sin $\theta$.

3. A recording system for a multichannel record disk according to claim 2, wherein said converting means comprises a diode network having a resistance value which varies nonlinearly with the applied voltage so that a characteristic curve indicating the input-output voltage relationship becomes approximately equal to a curve indicating the relationship between tan $\theta$ and sin $\theta$.

4. A recording system for a multichannel record disk according to claim 2, wherein said control means further comprises means including a variable resistor for controlling the level as a function of the point radius of a reproducing stylus.

5. A recording system for a multichannel record disk according to claim 2, wherein said control means further comprises an immediate stage in said level control means including an equalizer for providing a sum signal frequency vs. speed amplitude characteristic conforming to the RIAA standard characteristic.

6. A recording system for a multichannel record disk according to claim 2, wherein said control means further comprises phase selecting means for deriving the phase of the output signal in the same or opposite polarity relationship with respect to the phase of the input signal.

7. A system for recording and reproducing four channel signals comprising means for combining said signals into sum and difference signals before said recording, means responsive to at least one of said combined signals for angle-modulating at least some of said signals on a carrier before said recording, means responsive to another of said combined signals for controlling the phase of said carrier before said recording, means for operating said phase controlling means to produce a signal correction which is a function of the radius of a reproducing stylus, and means for combining and recording the signals after they are processed by the aforementioned means.

8. The system of claim 7 wherein said phase control means comprises means for causing a phase fluctuation in said carrier which compensates to the phase fluctuation of a reproduction stylus used during playback.

9. A recording system for a multichannel record disk comprising:

a. matrix means responsive to two channel signals for forming a sum signal and a difference signal;

b. equalizer means having an RIAA frequency response characteristic and connected to be energized responsive to said sum signal;

c. sound groove diameter selecting circuit means for adjusting a level of an output signal from said equalizer means in order to produce an output signal having a level corresponding to a $\tan\theta$ for a groove diameter in the record disk, wherein the $\tan\theta$ equals a ratio of a velocity amplitude of a groove of the record disk to a linear velocity of the groove;

d. $\tan\theta - \sin\theta$ conversion circuit means responsive to the output signal of said sound groove diameter selecting circuit means for producing an output signal having a level corresponding to a $\sin\theta$;

e. reproducing stylus radius selecting circuit means for adjusting the level of the output signal of said $\tan\theta - \sin\theta$ conversion circuit means to produce an output signal having a level corresponding to $r \cdot \sin\theta$, wherein $r$ is the radius of a reproducing stylus tip which is used to pick up a signal recorded on the record disk;

f. modulator means for angle-modulating a carrier signal responsive to the difference signal from said matrix means and to the output signal of said reproducing stylus radius selecting circuit means;

g. mixing means responsive to the sum signal from said matrix means and to the output signal of said modulator means for providing a multiplex signal; and h. means responsive to said mixing means for cutting and recording the multiplex signal in the groove of the record disk.

10. The recording system as defined in claim 9 wherein said sound groove diameter selecting circuit means comprises a variable resistor having an adjustable tap, the output signal of said equalizer means being applied across said variable resistor, and means for deriving the output signal of said sound groove diameter selecting circuit means from said variable tap.

11. The recording system as defined in claim 9 wherein said $\tan\theta - \sin\theta$ conversion circuit means comprises a series combination of a resistor and a diode network, the resistance value of said series combination decreasing nonlinearly as a voltage applied across the diode network rises so that an output signal corresponding substantially to $\sin\theta$ appears at a junction of the resistor and a diode network responsive to an input signal applied across the series combination.

12. The recording system as defined in claim 9 wherein said reproducing stylus radius selecting circuit means comprises a variable resistor having an adjustable tap, the output signal of said $\tan\theta - \sin\theta$ conversion circuit means being applied across said variable resistor, and means for deriving the output signal of said reproducing stylus radius selecting circuit means from said variable tap.

13. The recording system as defined in claim 9 further comprising phase selecting means which includes phase inverter means for phase-inverting the output signal of said reproducing stylus radius selecting circuit means, and switching means for selecting either the output signal of said reproducing stylus radius selecting circuit means or the output signal of said phase invertor means, said modulator means simultaneously angle-modulating the carrier signal responsive to the difference signal from said matrix means and a signal derived from said switching means.

* * * * *